United States Patent [19]
Okamoto

[11] Patent Number: 5,131,721
[45] Date of Patent: Jul. 21, 1992

[54] FRAMEWORK OF SEAT BACK WITH ARMREST

[75] Inventor: Hikonori Okamoto, Akishima, Japan
[73] Assignee: Tachi-S Co., Ltd., Japan
[21] Appl. No.: 635,943
[22] Filed: Dec. 28, 1990
[51] Int. Cl.$^5$ ............................................. A47C 7/02
[52] U.S. Cl. ................................. 297/452; 297/417
[58] Field of Search ..................... 297/411, 417, 452

[56] References Cited

U.S. PATENT DOCUMENTS

| | | | |
|---|---|---|---|
| 4,067,613 | 1/1978 | Pesiri | 297/417 X |
| 4,118,069 | 10/1978 | Hunter | 297/417 X |
| 4,205,879 | 6/1980 | Heling | 297/417 |
| 4,466,664 | 8/1984 | Kondou | 297/411 |
| 4,707,032 | 11/1987 | Chang | 297/417 X |
| 4,969,688 | 11/1990 | Chinomi et al. | 297/452 X |

*Primary Examiner*—Peter A. Aschenbrenner
*Attorney, Agent, or Firm*—Oldham, Oldham, & Wilson Co.

[57] ABSTRACT

A framework of seat back with an armrest, which includes an upper frame member, a pair of side frames secured thereto and a pair of reclining devices attached to the respective lower ends of the side frames. There is defined a reinforcement part extending from the upper frame member at the side where the armrest is provided, so that the armrest is supported on both side frame and reinforcement part, thereby providing a robust frame structure for supporting the armrest.

3 Claims, 3 Drawing Sheets

FRAMEWORK OF SEAT BACK WITH ARMREST

BACKGROUND OF THE INVENTION

1. Field of the Invention

The present invention relates to a framework of a seat back provided with an armrest in an automotive seat, and in particular to a seat back frame having a pair of side frames equipped at its respective lateral parts, with an armrest provided via a bracket at one of the two side frames.

2. Description of Prior Art

FIGS. 1 and 2 show a conventional structure of seat back frame with an armrest (A), which is basically formed by a pair of spaced-apart upper and lower frame members (2')(11'), a pair of side frames (3)(4), and an armrest (A). The upper frame member (2') is formed in an inverted U shape, having two ends (2'a)(2'a), and the lower frame member (11') is formed in a U shape, having two ends (11'a)(11'a). The two side frames (3)(4) are each disposed at the respective lateral sides of the upper and lower frames (2')(11'), such that the left side frame (3) extends over a space between the two opposed ends (2'a)(11'a) respectively of the upper and lower frame members (2')(11') and is at its upper end part (3a) fixed to the ends (2'a) of the upper frame member (2') while being at its lower end part (3b) fixed to the ends (11'a) of the lower frame (11'), and that the right side frame (4), likewise, extends over a space between another two opposed ends (2'a)(11'a) and is fixed respectively at its upper and lower end parts (4a) fixed to those ends (2'a)(11a'). To the left side frame (3), is fixed the armrest (A) by means of a support bracket (10'), such as to be rotatable vertically relative to the latter. With this structure, there is formed a seat back framework within a seat back (1), with the upper frame member (2') disposed at the upper area (1a) of the seat back 1 and the lower one (11') at the lower area (1c) thereof, as well as the armrest (A) provided laterally of the seat back (1).

A pair of reclining devices (15)(16) are arranged under the above-constructed seat back framework. The left-side reclining device (15) has upper and lower brackets (5)(8), each being fixed to the lower end part (3b) of the left side frame (3) and to the rearward end of a seat cushion (7). Likewise, the right-side reclining device (16) has upper and lower brackets (6)(9), each being fixed to the lower end part (4b) of the right side frame (4) and to the rearward end of the seat cushion (7). Such reclining devices (15)(16) are actuated simultaneously via a connecting rod (13) by operation of a handle (14), so as to adjust a reclining angle of the seat back (1) in relation to the seat cushion (7), whereby the seat back (1) is adjustably inclinable relative to the seat cushion (7) forwardly and backwardly.

A load is applied mainly to the upper part of the seat back (1) and transmitted through the two reclining devices (15)(16) to the seat cushion (7), and the reclining devices (15)(16) are structurally robust enough to resist the load.

However, it has been defective in this prior-art seat back framework that a load applied to the armrest (A) has to be received only by the left side frame (3), with the result that the right side of the seat back framework is prone to intensive experience of unbalanced load and likely to be deformed or damaged.

SUMMARY OF THE INVENTION

In view of the foregoing drawbacks, it is therefore a purpose of the present invention to provide an improved framework of seat cushion with an armrest, which is rigid enough to resist a load from the armrest.

For such purpose, according to the present invention, in a seat cushion framework comprising an upper frame member, a pair of side frames secured thereto, a pair of reclining devices attached to the respective lower ends of the side frames, and an armrest provided at one of the two side frames, there is defined a reinforcement part continuously from the upper frame member, which reinforcement part is fixed to one of the two side frames, with the arrangement that the armrest is via a support bracket fixed on both reinforcement part and said one of the side frames.

Accordingly, the provision of such reinforcement part gives a regidity or robust property to the seat back frame enough for resisting a force applied from the armrest.

In one aspect, a metallic pipe member may be bent into a generally C-shaped contour to form a seat back framework having the upper frame member, the reinforcement part and a lower frame member, which simplifies its structure and reduces costs involved in the seat assemblage.

DETAILED DESCRIPTION OF PREFERRED EMBODIMENT OF THE INVENTION

First of all, all constituent elements of a seat back framework with an armrest in accordance with the present are identical to those of the aforementioned prior-art seat back framework, excepting a bracket for supporting the armrest (A) and a pair of upper and lower frame members. Hence, a specific description on the corresponding elements and parts is omitted here, and like designations in the foregoing prior art description refer to like ones to be given in the hereinafter description on the present invention.

Figure 3:
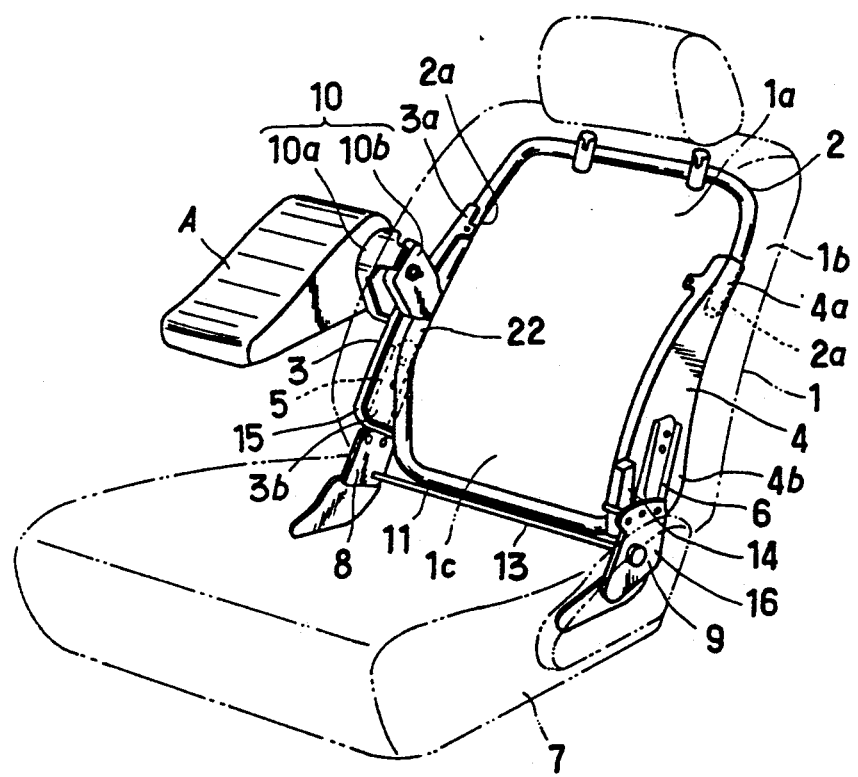
FIG. 3 is a schematic perspective view of a framework of seat back with an armrest in accordance with the present invention.
Figure 4:
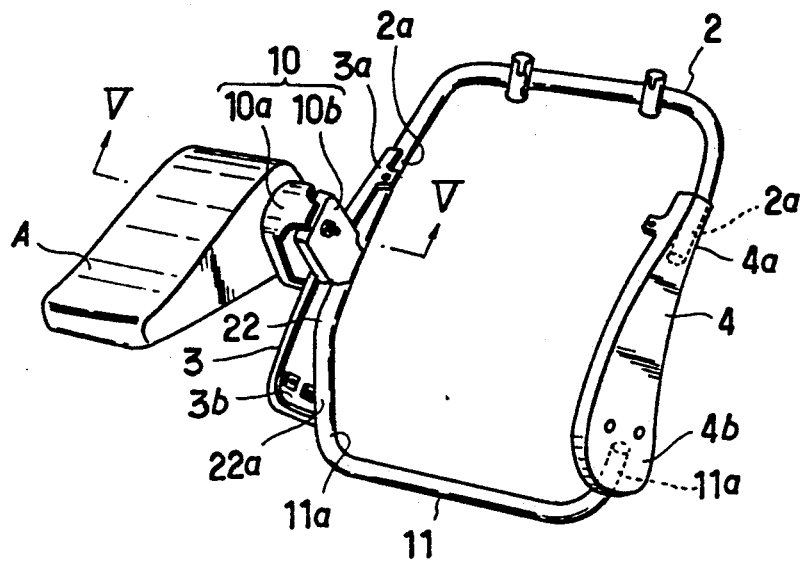
FIG. 4 is a perspective view of a principal part of the framework as in the FIG. 3.
Figure 5:
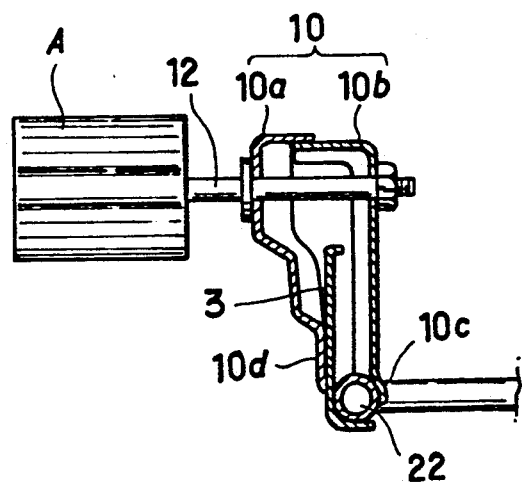
FIG. 5 is a sectional view taken along the line V—V in the FIG. 4.

Reference is now made to FIGS. 3, 4 and 5, which illustrate a framework of seat back equipped with the armrest (A) in accordance with the present invention.

Basically, the seat back frame to be provided within the seat back (1) comprises a upper frame member (2) of an inverted-U-shaped contour having a pair of downwardly oriented lower end frame sections (2a)(2a), a lower frame member (11) of a U-shaped contour having a pair of upwardly oriented upper end frame sections (11a)(11a), and a pair of side frames (3)(4).

The upper frame member 2) and lower frame member (11) are so arranged generally on a vertical plane with respect to the seat cushion (7), that a reinforcement part (22) is interposed between the left-side lower end frame section (2a) of the upper frame (2) and the left-side upper end frame section (11a) of the lower frame (11), whereas a space is provided between the opposing right-side lower and upper frame sections (2a)(11a) respectively of the upper and lower frame members (2)(11).

A pair of side frames (3)(4) are attached securely to the respective lateral sides of the above-constructed seat back frame. Specifically, the left side frame (3) is disposed at the foregoing reinforcement part (22), with the upper end part (3a) of the side frame (3) being secured to the left-side lower end frame section (2a) of the upper frame member (2) and the lower end part (3a) of the side frame (3) secured to the left-side upper end frame section (11a) of the lower frame member (11). The right side frame (4) is disposed at the right lateral side opposite to the position of the right side frame (3), such that the frame (4) bridges over the space between the lower and upper end frame sections (2a) (11a) respectively of the upper and lower frame members (2)(11), to thereby connect those two frame sections (2a)(1a), with the upper end part (4a) of the side frame member (4) being secured to the lower end frame section (2a) of the upper frame member (2) and the lower end part (4b) thereof secured to the upper end frame section (11a) of the lower frame member (11).

Figure 1:
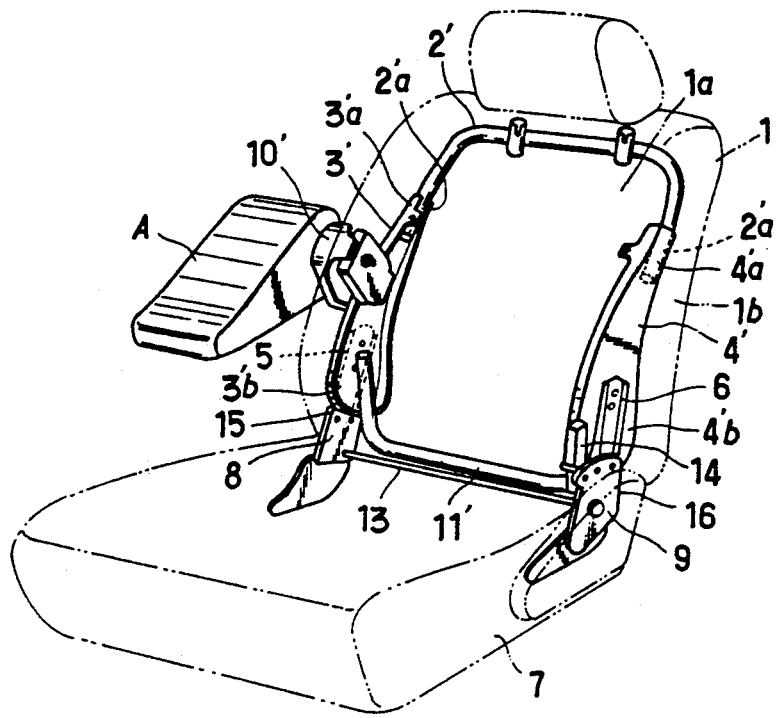
FIG. 1 is a schematic perspective view of a conventional framework of seat back with an armrest.
Figure 2:
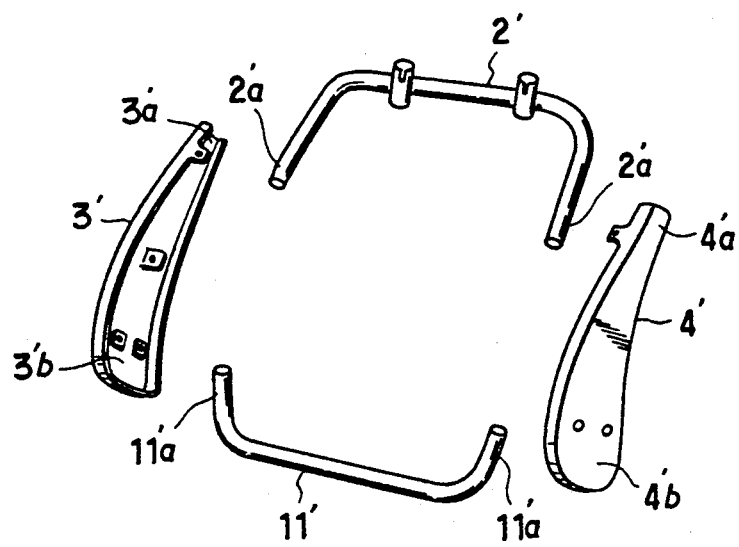
FIG. 2 is an exploded perspective view of a main constituent part of the same in FIG. 1.

As understandable from FIG. 2, the upper frame member (2), reinforcement part (22) and the lower frame member (11) are formed by bending a metallic pipe material into a generally C-shaped contour.

As best seen from FIG. 4 and 5, the armrest is securely mounted at the left side of the seat back framework by means of a support bracket (10). More specifically stated, the support bracket (10) comprises an outward bracket member (10a) and an inner bracket member (10b). Referring to FIG. 4, the outward and inner bracket members (10a)(10b) are coupled together, in such a manner that the upper end areas of the two bracket members (10a)(10b) are welded together, and that, while the inward bracket member (10b) is at its lower end area (10b-1) welded fast on the reinforcement part (22), the outward bracket member (10a) is at its upper end area (10a-1) welded fast on the outer lateral surface of the left side frame (3). A shaft (12) passes through both outward and inward bracket members (10a)(10b) and secured thereto by means of a suitable member such as a securing nut. At the outwardly projected free end of the shaft (12), is secured the armrest (A) in a manner to be rotatable about the axis of the shaft (12), allowing vertical rotative movement of the armrest (A) relative to the seat back framework.

Accordingly, as constructed above, the seat back framework in accordance with the present invention is effective in increasing the rigidity or robust property in supporting the armrest (A), providing a sufficient resistance against horizontally or vertically applied force from the armrest (A). Further, the mere provision of the reinforcement part (22) between the upper and lower frame members (2)(11) simplifies the structure of the seat back frame per se, which also adds to the rigidity of the support bracket (10), contributing to an inexpensive assemblage of the seat.

It should be noted that, preferably, the reinforcement part (22) should be formed by being extended from the left-side lower end frame section (2a) of the upper frame member (2), to be integrally connected to the upper end frame section (11a) of the lower frame member (11).

While having been described as above, the present invention is not limited to the illustrated embodiment, but any other modifications, replacements and additions may structurally be possible without departing from the spirit and scope of the appended claims.

What is claimed is:

1. A framework of seat back frame with an armrest, in which said seat back frame is provided within a seat back of a seat and further includes an upper frame member of a generally inverted U-shaped configuration, a lower frame member of a generally U-shaped configuration, a pair of side frames interposed between said upper and lower frame members, and a bracket means for supporting said armrest in a rotatable way, said bracket means being fixed on one of said pair of side frames, wherein said framework further comprises a reinforcement part defined at one lateral side of said upper and lower frame members where said bracket means is located, said upper frame member, said lower frame member and said reinforcement part being integrally formed together whereby said seat back frame presents a generally C-shaped configuration.

2. The framework as defined in claim 1, wherein said bracket means comprises a support bracket including outward and inward bracket members, both of which are welded together, sandwiching therein said one of said pair of said frames, and further welded integrally with said reinforcement part.

3. The framework as defined in claim 1, wherein said upper frame member, reinforcement part and lower frame member are formed by bending a metallic pipe material into a generally C-shaped configuration.

* * * * *